Patented Sept. 26, 1944

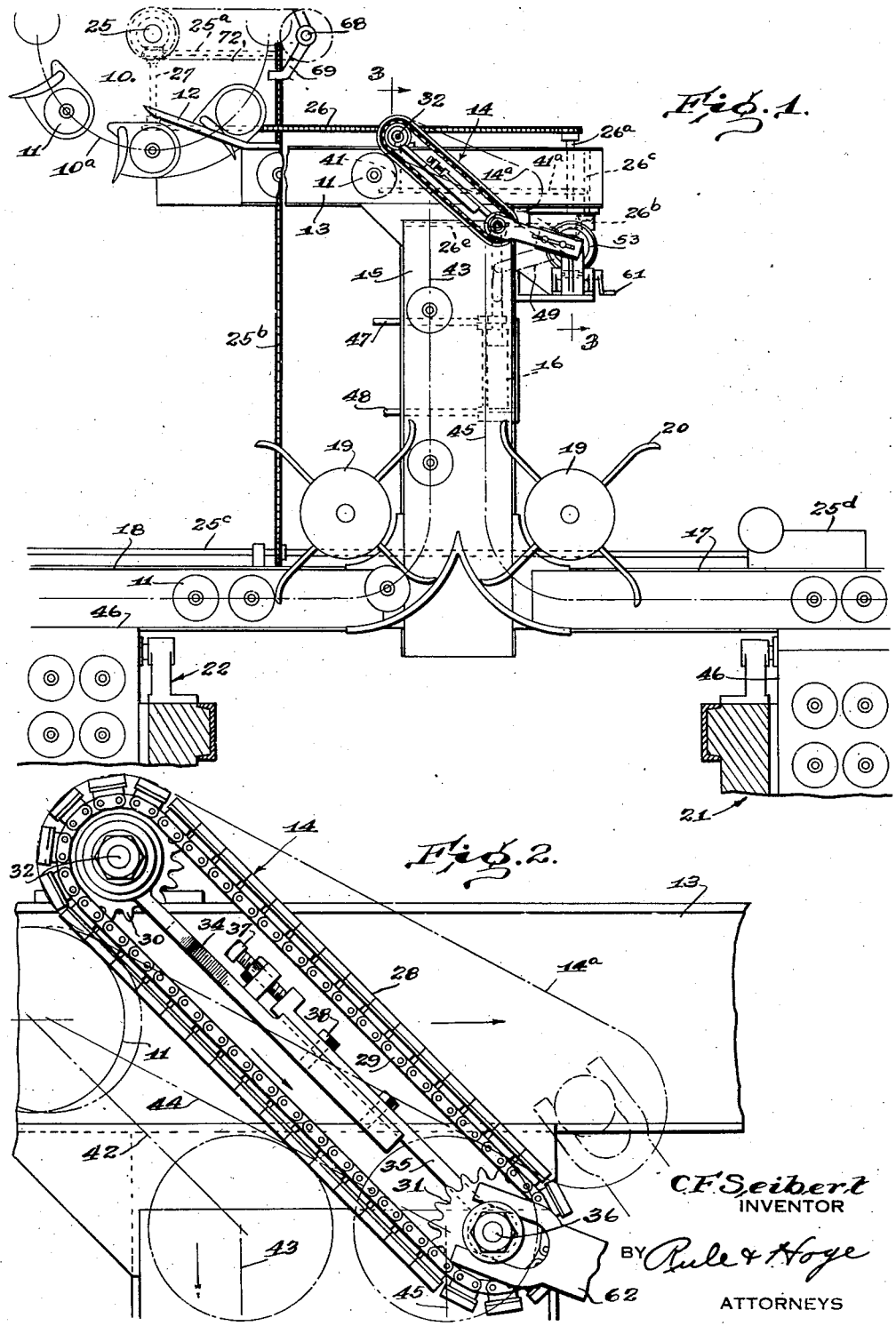

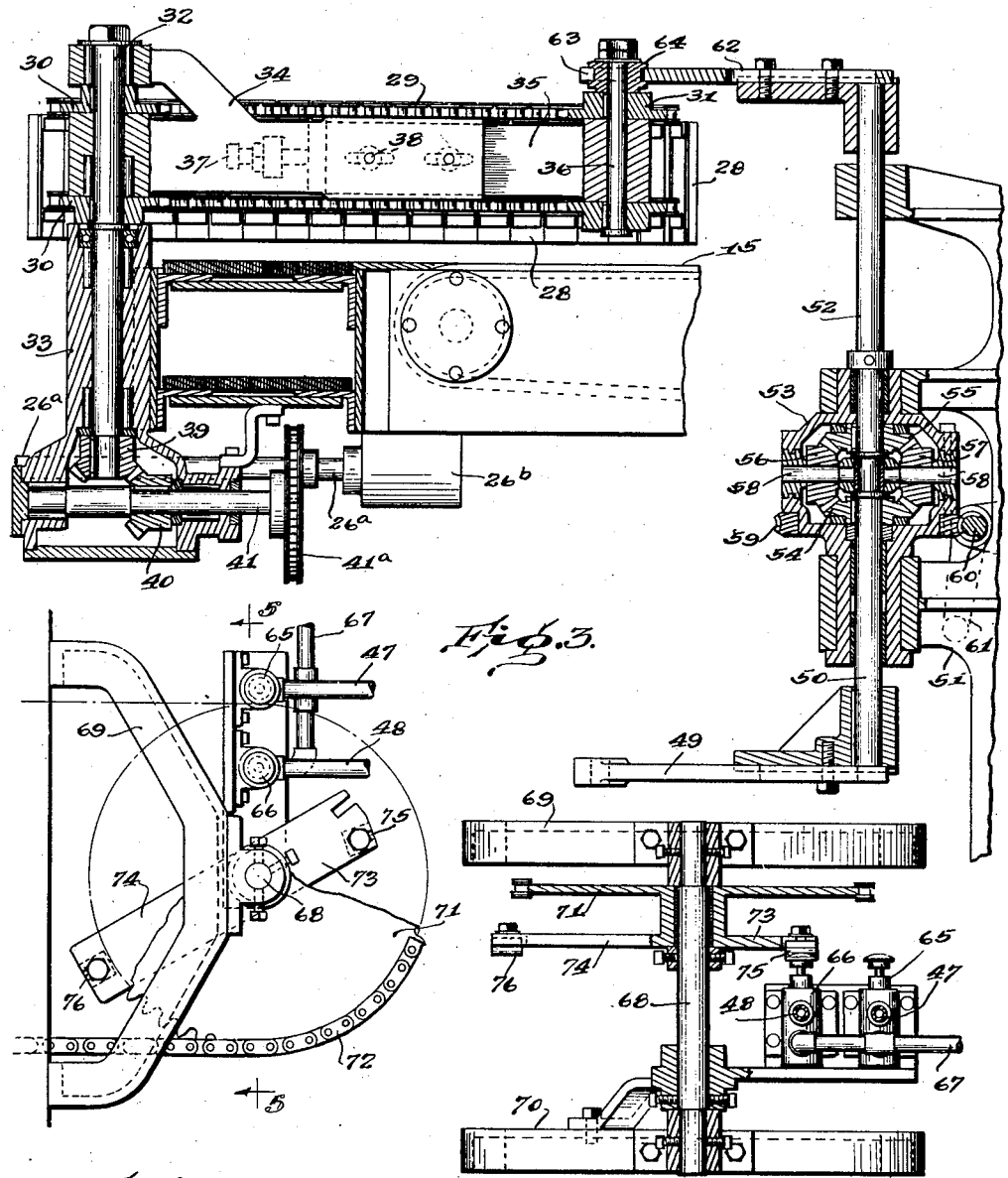

2,359,252

UNITED STATES PATENT OFFICE 2,359,252

ARTICLE SELECTING AND TRANSFER MECHANISM

Charles F. Seibert, Alton, Ill., assignor to Owens-Illinois Glass Company, a corporation of Ohio Application May 29, 1941, Serial No. 395,770

5 Claims. (Cl. 198—31)

My invention relates to apparatus for receiving articles delivered thereto seriatim and selectively separating the articles into different groups and transferring them to predetermined positions.

An object of the invention is to provide apparatus by which articles which may differ in size, shape or other characteristics may be selectively segregated and grouped in accordance with such characteristics.

The invention in the form herein illustrated is particularly adapted for receiving bottles, jars or other articles as they are delivered from a forming machine and separating the articles into different groups which are conveyed respectively to separate annealing leers. Machines for blowing or molding glass articles commonly comprise a multiplicity of molds and frequently a plurality of sets of molds for molding articles of different size or shape are used at the same time on a machine. For example, the annular series of molds on a machine may include a set of molds for making an article of one size or shape, alternating with molds for making articles of a different size or shape. The articles as delivered from the machine are transferred while still hot to an annealing leer or leers. The annealing requirements for one group of articles may be different from those of another group having different size, shape or wall thickness, made concurrently on the same machine. An object of the present invention is to provide automatic means for segregating and grouping such articles and conveying said groups to the annealing leers.

Other objects of the invention will appear hereinafter.

Referring to the accompanying drawings which illustrate an apparatus embodying the principles of my invention:

Fig. 1 is a partly diagrammatic plan view of an apparatus for receiving bottles or jars and directing them selectively to separate conveyors from which they are transferred to the annealing leers.

Fig. 2 is a fragmentary plan view on a larger scale showing particularly the deflector device.

Fig. 3 is a sectional view substantially as indicated by the line 3—3 on Fig. 1.

Fig. 4 is a plan view of a timer device and valves operated thereby.

Fig. 5 is a sectional elevation at the line 5—5 on Fig. 4.

The apparatus comprises, in general terms, a device 10 which may be a conventional uprighter from which bottles 11 or other articles are deflected by an arm 12 onto an endless belt conveyor 13, a deflector device 14 by which the articles are directed to a conveyor 15, a piston motor 16 operatively connected to the deflector device 14 for periodically rocking it and thereby causing it to direct the articles alternately to different positions on the conveyor 15, cross-conveyors 17 and 18, transfer devices comprising turn-tables 19 with transfer fingers 20 for transferring the articles from the conveyor 15 to the cross-conveyors, and annealing leers 21 and 22 to which the articles are transferred in a conventional manner from the cross-belt conveyors 17 and 18 respectively.

The device 10 from which the bottles 11 are delivered to the conveyor 13 may be a conventional uprighting apparatus such as shown, for example, in the patent to Benoit, 1,981,462, November 20, 1934. Such apparatus is adapted to receive the bottles 11 as they are delivered from the bottle blowing machine and includes means for swinging them from a recumbent to an upright position and placing them on an endless carrier 10a which may be driven from a continuously rotating shaft 25. The horizontal endless belt conveyor 13 is driven continuously in synchronism with the uprighter conveyor 10a through driving connections including a sprocket chain 26 and gearing 27. The chain 26 drives a shaft 26a which extends into a gear box 26b (Figs. 1 and 3) and through gearing therein is connected to the shaft 26c which drives the conveyor 13. The shaft 26c is connected through gears in the gear box 26b to the shaft 26e which drives the conveyor 15. The conveyor 15 and the cross-conveyors 17 and 18 are all driven in synchronism with the conveyor 13, being interconnected through suitable driving mechanism. The means for driving the cross-conveyors includes a shaft 25a geared to the shaft 25, a sprocket chain 25b, and line shaft 25c. The latter has driving connections with the cross-conveyors through gearing within gear boxes 25d.

The deflector device 14 is located in the transfer zone in which the bottles are transferred from the conveyor 13 to the conveyor 15. It comprises an endless belt 28 consisting of slats mounted on a pair of sprocket chains 29 trained over driving sprocket wheels 30 and driven sprocket wheels 31. The driving sprockets 30 are keyed to a vertical shaft 32 journalled in a post 33 which forms part of the framework on which the several conveyors are supported. The shaft 32 provides a support for the deflector arm which comprises sections 34 and 35 mounted respectively on the shaft 32 and a shaft 36, the latter having keyed thereto the sprocket wheels 31. The sections 34 and 35 of the deflector arm are relatively adjustable lengthwise for taking up slack in the endless chains (see Fig. 2). The arm may be adjusted by means of a screw 37 and the sections clamped in adjusted position by clamping bolts 38.

The belt 28 is driven continuously in a counterclockwise direction by the shaft 32 which has driving connections with the chain 26 through a train of gearing including intermeshing gears 39 and 40 keyed respectively to the shaft 32 and a horizontal shaft 41. The shaft 41 is driven from the shaft 26a through a sprocket chain 41a. The deflector 14 is mounted to swing about the axis of the shaft 32 from the full line position (Figs. 1 and 2) to the broken line position. When in the full line position it serves to direct the bottles 11 onto the left-hand portion of the conveyor 15. That is to say, the bottle 11 when it contacts with the deflector belt 28 is directed in a diagonal path indicated by the broken line 42 (Fig. 2) and thus transferred to the conveyor 15 and then carried with the conveyor along the path indicated by the line 43. When the deflector 14 is swung to the dotted line position 14a, the bottles are directed in the path indicated by line 44 (Fig. 2) to the right-hand portion of the conveyor belt 15 and carried with the latter along the path indicated by line 45. The turn-tables 19 are driven in synchronism with the conveyor belts so that the transfer fingers 20 engage the bottles and transfer them to the cross-belt conveyors 17 and 18 from which they are delivered to the leer conveyors 46.

The means for swinging the deflector 14 comprises the piston motor 16 which may be operated by air or other fluid under pressure supplied to the opposite ends of the motor cylinder through pipes 47 and 48 respectively. The motor piston rod has a link connection with the outer end of a rock arm 49 keyed to one end of a rock shaft 50 (Fig. 3). The shaft 50 is journalled in a bracket or frame 51 in which is also journalled a shaft 52 in alignment with the shaft 50. A driving connection is provided between the shafts 50 and 52 by means of differential gearing within a gear box 53 mounted for rotative adjustment in the frame 51. The differential gearing includes bevel gears 54 and 55 keyed respectively to the shafts 50 and 52, and intermediate gears 56 and 57 meshing with the gears 54 and 55. The gears 56 and 57 are rotatable about the axis of their stud shafts 58 mounted in the casing 53. The casing has secured thereto a worm wheel 59 which meshes with a worm 60 on a worm shaft journalled in the frame 51 and carrying a hand crank 61. This permits rotative adjustment of the casing 53, thereby rotatively adjusting the shaft 52 relative to the shaft 50.

The shaft 52 has fixed to its outer end a rock arm 62, the outer end of which is formed with a fork 63 which straddles a collar 64 on the shaft 36, so that when the arm 62 is rocked, the deflector 14 is rocked about the shaft 32. It will be noted that when the shaft 50 is rocked by the piston motor in one direction, it operates through the differential gearing to rock the shaft 52 in the opposite direction.

The operation of the motor 16 is controlled through valves 65 and 66 (Figs. 3 and 4) in the pipe lines 47 and 48 respectively which lead to the opposite ends of the motor cylinder. The air or other operating fluid under pressure is supplied through a pressure pipe 67 leading to the valves. The valves are actuated periodically by a differential timer device including a shaft 68 mounted in a pair of brackets 69 and 70 attached to the framework of the apparatus. Journalled on the shaft 68 is a sprocket gear wheel 71 driven continuously from the shaft 25 (Fig. 1) through a sprocket chain 72. Arms 73 and 74, extending radially of the shaft 68 in opposite directions, are rotated with the wheel 71 and as herein shown are formed integral with the hub of said wheel. Buttons 75 and 76 are attached to the under side of the arms 73 and 74 respectively in position to contact the valve stems of the valves 66 and 65, and serve as cams for actuating the valves. The valves are thus operated in alternation, and cause the piston motor to operate once during each half rotation of the sprocket gear 71. The opening of the valves is so timed that the deflector 14 is actuated at time intervals corresponding to the time intervals at which the bottles are delivered from the successive heads or units of the uprighter to the conveyor 13. As a result, the bottles are delivered alternately to the conveyor 15 at the two lines of travel 43 and 45. If the uprighter 10 should fail to deliver the bottles regularly at the predetermined intervals, that is, if one or more of the bottles should be missing, then the deflector 14 will operate idly. It will thus be seen that any interruption in the continuity of the supply of bottles will not interfere with the remaining bottles being properly directed to the respective leers depending on the particular head or unit of the uprighter from which the bottle is delivered to the conveyor 13.

Modifications may be resorted to within the spirit and scope of my invention.

I claim:

1. The combination of a horizontal belt conveyor, means for driving the conveyor horizontally and causing articles which are placed thereon to be brought in succession to a transfer zone, a deflector positioned directly over said conveyor and extending diagonally across the conveyor at said zone in the path of the articles, said deflector being pivoted at one end to swing horizontally and having its pivot at one side of said conveyor, and automatic means for periodically swinging the deflector about its pivot and thereby shifting the angular position of said deflector relative to the conveyor and bringing its free end to a plurality of discharge positions at the opposite side of the conveyor from said pivot and spaced apart lengthwise of the said conveyor, and arresting the deflector at each said discharge position, thereby causing the articles to be selectively discharged from the conveyor at different positions, said deflector comprising an endless belt and means for driving said belt in the direction in which the articles in contact therewith are moving during their discharge from the said conveyor.

2. The combination of a horizontally traveling belt conveyor by which articles are brought in succession to a transfer zone, a deflector positioned directly over and extending diagonally across said conveyor at said zone, said deflector being positioned in the path of the articles and mounted for horizontal swinging movement about a pivot at one side of said conveyor, automatic means for periodically swinging the deflector about its pivot to a plurality of stop positions in which the free end of the deflector extends beyond the conveyor and thereby causing the articles to be selectively discharged from the conveyor at a plurality of predetermined positions spaced lengthwise of the conveyor at the opposite side thereof from said pivot, said deflector comprising an endless belt and means for driving said belt in the direction in which the articles in contact therewith are moving during their discharge from the conveyor, and a second horizontally traveling conveyor extending at an angle to the first mentioned conveyor in position to receive the articles discharged from the first conveyor, said deflector being positioned to extend over the second conveyor and guide the articles onto the second conveyor as they are discharged from the first conveyor and position the articles in separate rows on said second conveyor.

3. The combination of horizontally disposed conveyors extending at right angles from a transfer zone, means for driving the conveyors, and transfer mechanism for shifting articles from one to the other of said conveyors, said mechanism including a deflector arm pivoted at one end for horizontal oscillating movement and extending across a said conveyor at the transfer zone, a piston motor, and operating connections between said motor and the deflector arm, said connections including a pair of aligned shafts, differential gearing providing driving connection between said shafts, a rock arm connected to one shaft, means providing connection between said rock arm and the motor piston, and a second rock arm connected to the other said shaft and pivotally connected to the opposite end of said deflector arm.

4. The combination of horizontally disposed conveyors extending at right angles from a transfer zone, means for driving the conveyors, and transfer mechanism for shifting articles from one to the other of said conveyors, said mechanism including a deflector arm pivoted at one end for horizontal oscillating movement and extending across a said conveyor at the transfer zone, a piston motor, and operating connections between said motor and the deflector arm, said connections including a pair of aligned shafts, differential gearing providing driving connection between said shafts, a rock arm connected to one shaft, means providing connection between said rock arm and the motor piston, a second rock arm connected to the other said shaft and pivotally connected to the opposite end of said deflector arm, a gear casing within which said differential gearing is mounted, and manual means for rotatively adjusting said gear casing and thereby rotatively adjusting one of said shafts relative to the other said shaft.

5. The combination of a horizontal belt conveyor, means for driving the conveyor horizontally and causing articles which are placed thereon to be brought in succession to a transfer zone, a deflector positioned directly over said conveyor and extending diagonally across the conveyor at said zone in the path of the articles, said deflector being pivoted at one end to swing horizontally and having its pivot at one side of said conveyor, and automatic means for periodically swinging the deflector about its pivot and thereby shifting the angular position of said deflector relative to the conveyor and bringing its free end to a plurality of discharge positions at the opposite side of the conveyor from said pivot and spaced apart lengthwise of the said conveyor, and arresting the deflector at each said discharge position, thereby causing the articles to be selectively discharged from the conveyor at different positions.

CHARLES F. SEIBERT.